June 27, 1950 W. L. ROBERTS 2,512,680

ELECTRONIC PULSE TRANSMISSION SYSTEM

Filed Oct. 3, 1947 6 Sheets-Sheet 1

Inventor
William Leslie Roberts
By
R. P. Morris
Attorney

June 27, 1950 W. L. ROBERTS 2,512,680

ELECTRONIC PULSE TRANSMISSION SYSTEM

Filed Oct. 3, 1947 6 Sheets-Sheet 2

Inventor
William Leslie Roberts
By
R. P. Morris
Attorney

June 27, 1950 W. L. ROBERTS 2,512,680

ELECTRONIC PULSE TRANSMISSION SYSTEM

Filed Oct. 3, 1947 6 Sheets-Sheet 3

William Leslie Roberts Inventor

By [signature] Attorney

June 27, 1950 W. L. ROBERTS 2,512,680

ELECTRONIC PULSE TRANSMISSION SYSTEM

Filed Oct. 3, 1947 6 Sheets-Sheet 4

Inventor
William Leslie Roberts
By
R. P. Morris
Attorney

ELECTRONIC PULSE TRANSMISSION SYSTEM

Filed Oct. 3, 1947 6 Sheets-Sheet 5

Inventor
William Leslie Roberts
By
R. P. Morris
Attorney

DELAY CIRCUIT WAVE FORMS
(GRID TRIGGERED)

Inventor
William Leslie Roberts
By
R. P. Morris
Attorney

Patented June 27, 1950 2,512,680

UNITED STATES PATENT OFFICE 2,512,680

ELECTRONIC PULSE TRANSMISSION SYSTEM

William Leslie Roberts, London, England, assignor to International Standard Electric Corporation, New York, N. Y., a corporation of Delaware Application October 3, 1947, Serial No. 777,761
In Great Britain October 4, 1946

8 Claims. (Cl. 177—380)

This invention relates to electronic pulse systems and in particular to systems wherein a pulse is required to be delivered at a particular time position in a time period.

According to one of its features, the invention consists of electronic means for the step-by-step selection of anyone of a number of predetermined positions in a time cycle, for the transmission of a pulse of electrical energy.

According to another of its features, the invention consists of a pulse generating device adapted to produce an output pulse in response to a cycle of incoming pulses and in which the output pulse is used to control the influence of a signal on the response of the device to incoming pulses.

The invention will be clearly understood from the following description of certain embodiments thereof, whereby the time position in a recurrent cycle, for the delivery of an output pulse, can be determined and altered by the application of appropriate signals, in relation to the accompanying drawings in which—

In this figure, the rectangles representing the various elements in the embodiment have references corresponding to equivalent positions of the later figures.

Figure 3:
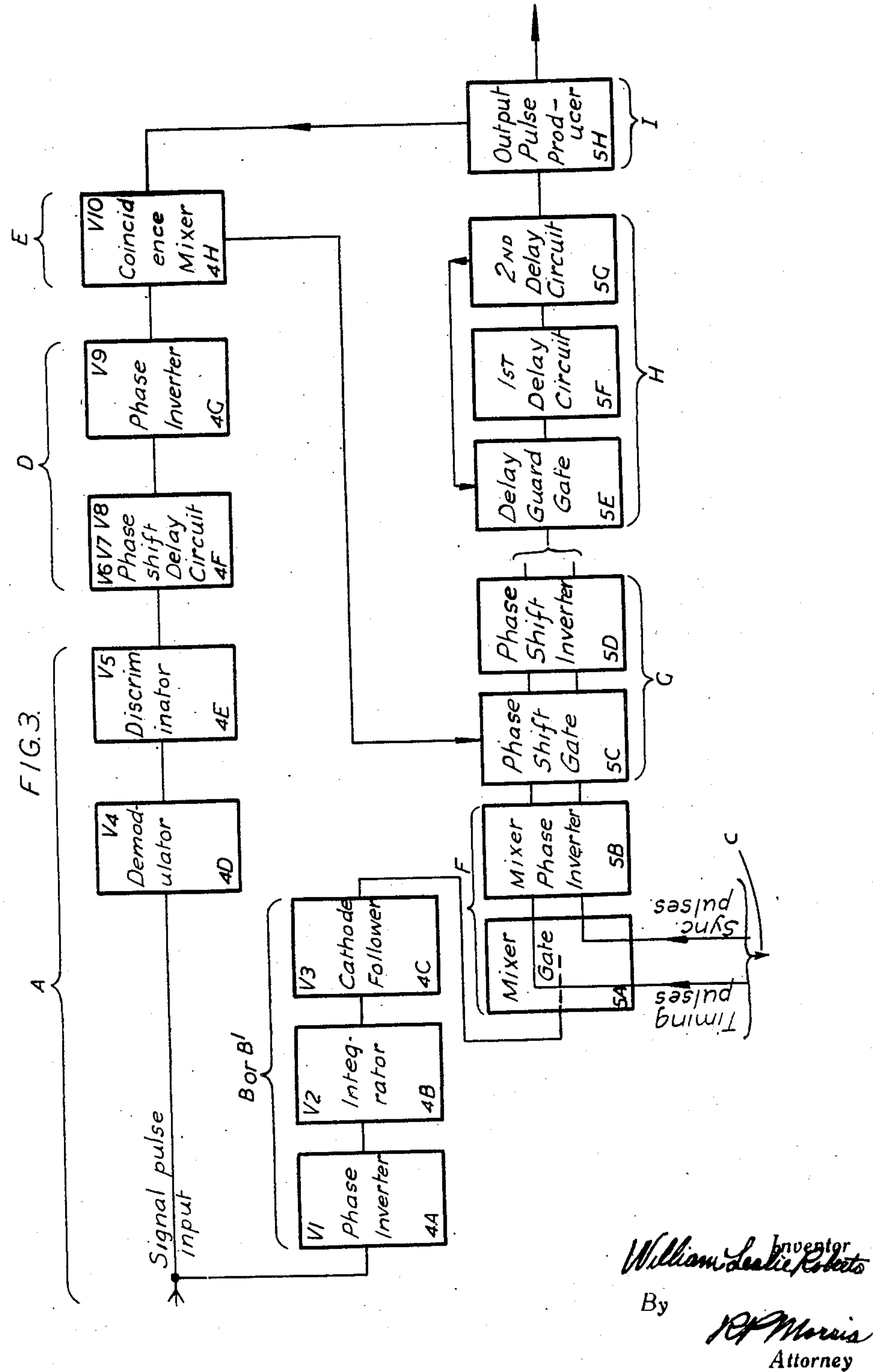
Fig. 3 is a block schematic diagram of an embodiment of the invention developed for use in an automatic switching system.
Figures 4, 4A, 4B, 4C, 4D, 4E, 4F, 4G, 4H:
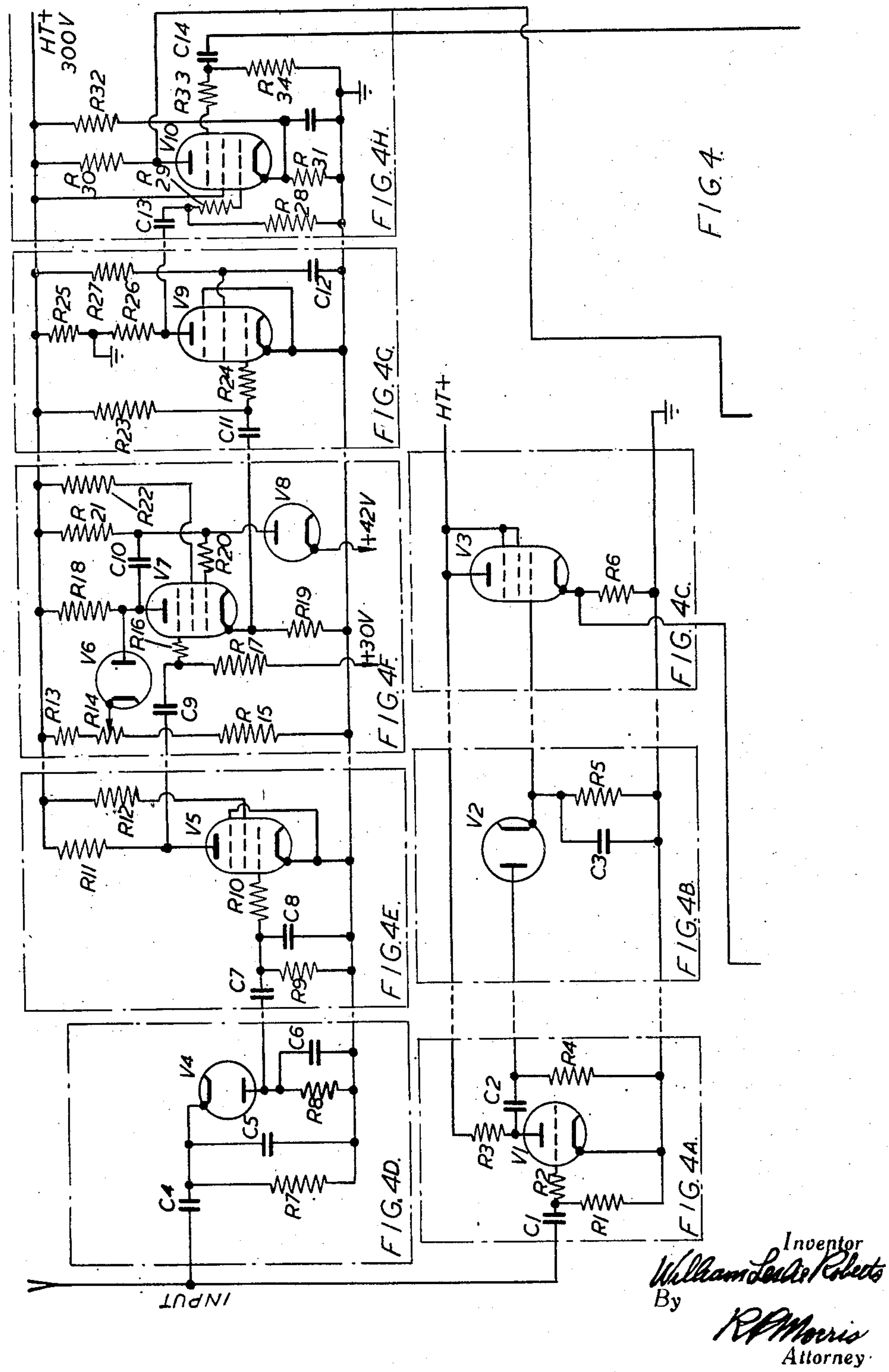
Figures 5, 5A, 5B, 5C, 5D, 5E, 5F, 5G, 5H:
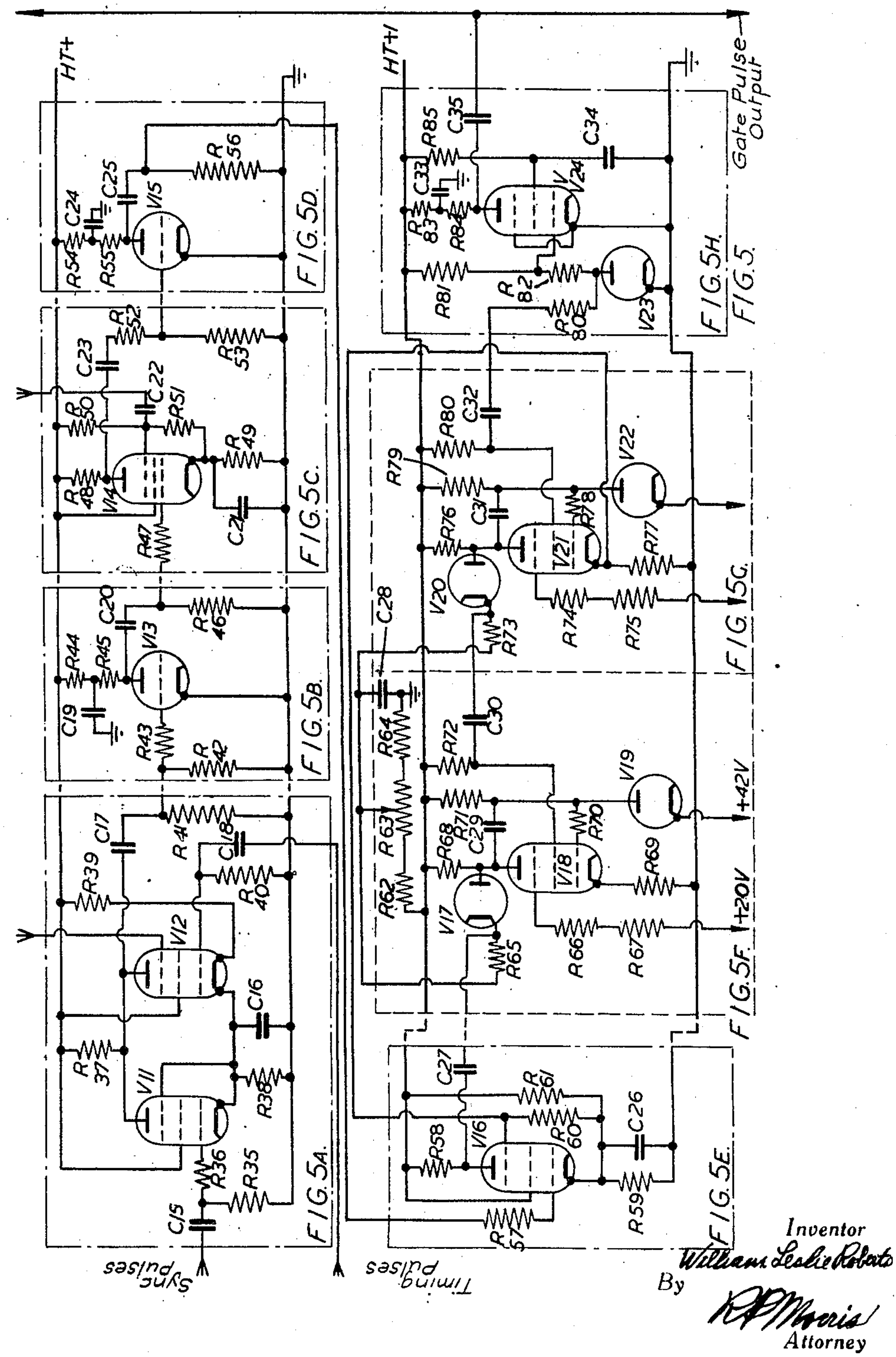

Figs. 4 and 5 which should be read together as one figure (Fig. 4 and Fig. 5 below) are detailed circuit diagrams of the embodiment shown in Fig. 3.

Figure 6:
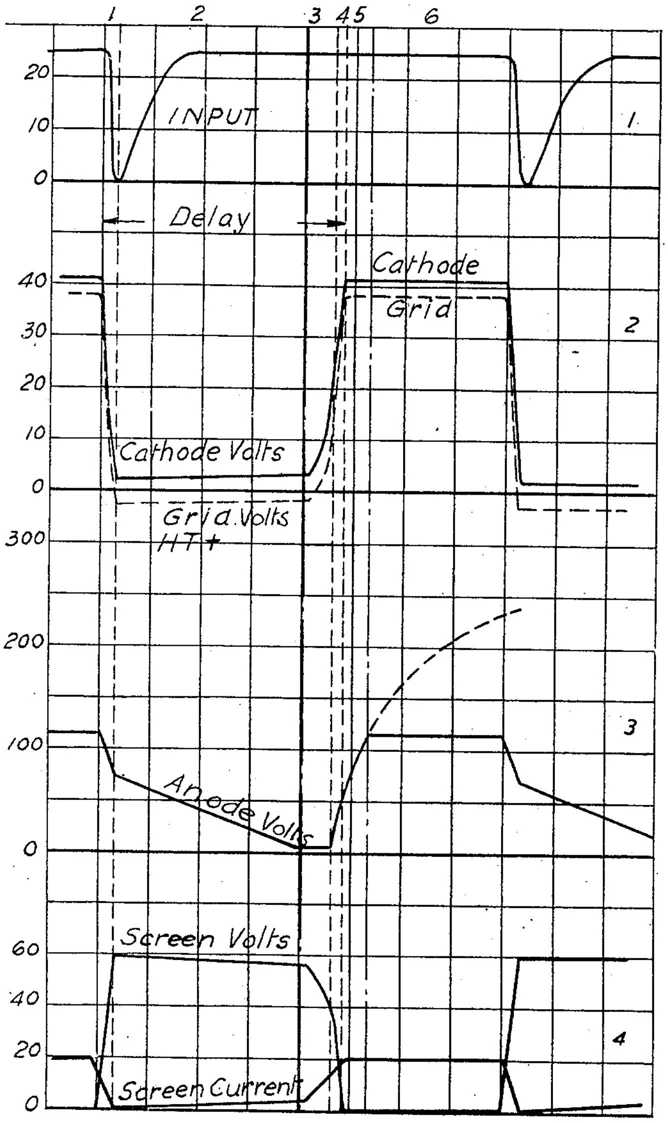

Fig. 6 is a timing diagram showing in graphic form the wave forms obtained in the cycle of operations in delay circuit 5F.

Figure 1:
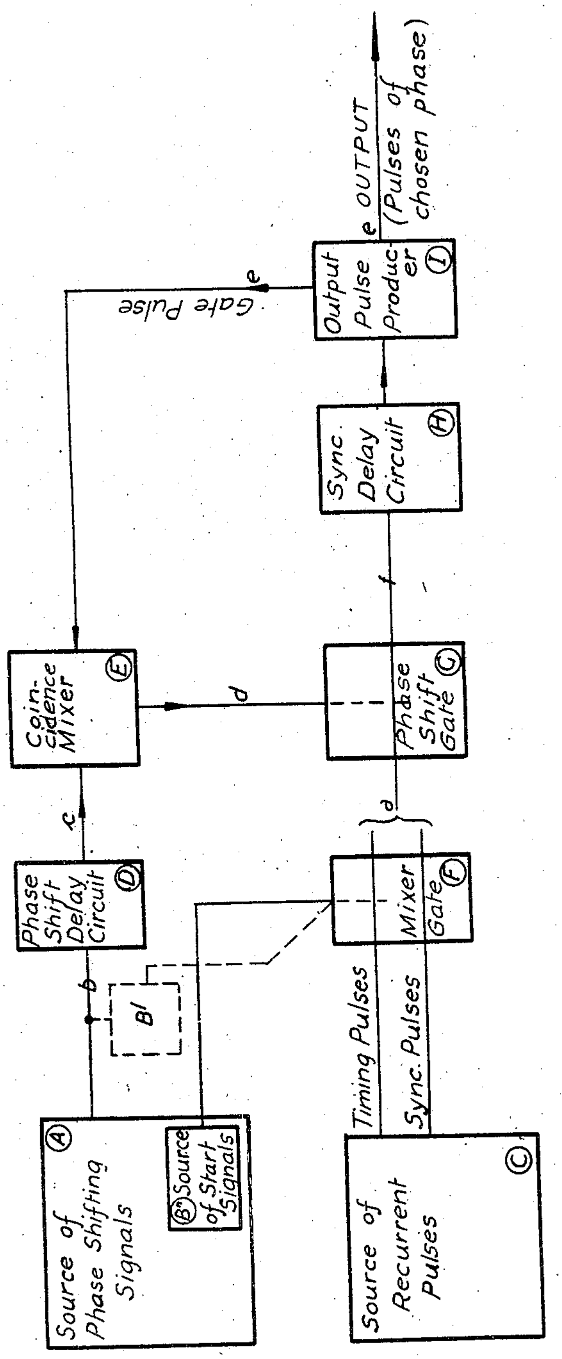
Fig. 1 is a block schematic diagram of a phase determining and shifting arrangement.

Referring to Figure 1, a series B of recurrent pulses, hereinafter called the "timing pulses," is provided and one particular pulse in a cycle of these pulses, is produced separately from the remaining pulses or so arranged that one connection from the said source bears the one particular pulse alone whilst another connection bears the remaining pulses or all the pulses. The particular pulse will be hereafter referred to as the synchronising pulse, abbreviated to "sync pulse." It may be fixed permanently in a particular phase relation to the cycle of timing pulses or may be capable of being changed in phase.

The time taken to complete one cycle of timing pulses is hereinafter called the "pulse cycle time."

A source of operating or phase shifting signals, A is provided, which produces the signals which initiate the change of phase of the pulses emerging from the equipment.

The source A can also be arranged to transmit a start signal before or coincident with the first phase shifting signal. The source of start signals is indicated at B'' within the rectangle A.

Figures 2, 2A, 2B:
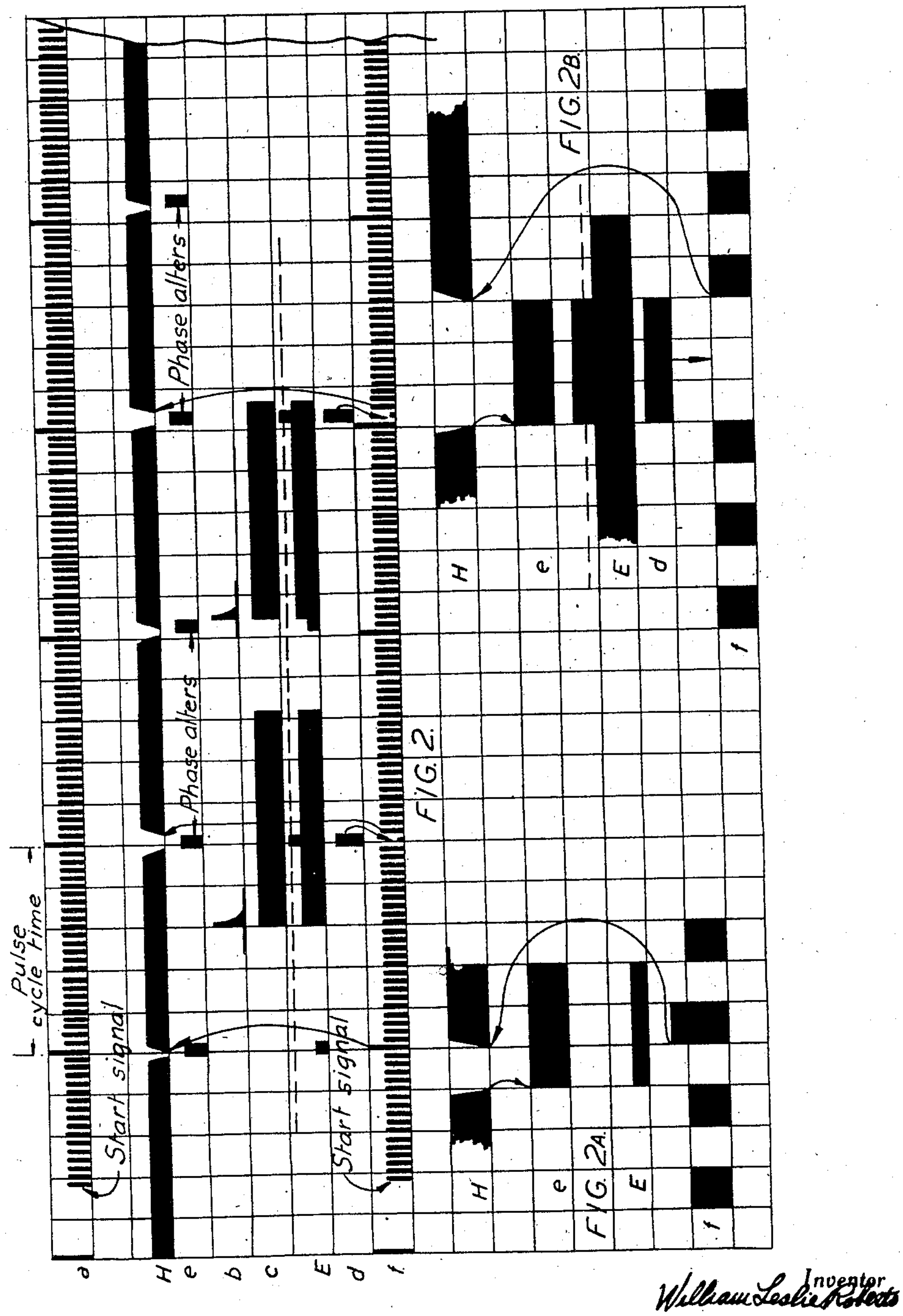
Fig. 2 is a timing diagram showing the conditions at various points in Fig. 1 in graphic form.

Timing pulses and sync pulses are fed along separate paths to a mixer gate F, which normally blocks the passage of the former, opening only when a sync pulse is received simultaneously with a tuning pulse. The beginning of line *a* Fig. 2, shows this, where the pulse shown on the left margin line represents the pulse which normally gets through the mixer gate F.

The output of mixer gate F is passed via the phase shift gate G, which is normally in a conducting condition, to a delay circuit H, of a type which is capable of being triggered by a pulse but is insensitive thereafter to other pulses during the period of the delay, which is slightly less than the pulse cycle time.

The delay circuit H feeds an elongated pulse (represented on the line H of Fig. 2) to an output pulse producer I, which is arranged to emit a pulse *e* hereinafter called the "output pulse" starting at or immediately after the end of the delay period of delay circuit H. This pulse *e* is shown on the line *e* of Fig. 2.

The determining or alteration of the phase *e* of this pulse in relation to the cycle of timing pulses is accomplished in the manner hereinafter described.

The output pulse *e* must be timed so that it brackets and is preferably though not necessarily of somewhat longer duration than a sync pulse or timing pulse.

In the normal condition, therefore, the sync pulse passes through F and G and triggers the sync delay circuit H producing the elongated pulse indicated on line H of Fig. 2. The delay period is measured out and the output pulse producer I emits an output pulse *e* at the end of it. The delay of H ends and the output pulse occurs at a time which brackets the next sync pulse. This is shown in lines H, *e*, and *f*, of Fig. 2 and in the corresponding lines of inset Fig. 2A where the scale along the horizontal axis is enlarged ten times. The delay circuit is therefore again receptive in time to be triggered by this next sync pulse and this becomes a recurrent cycle of operations, the output pulse bearing a constant phase relationship to the cycle of pulses.

In lines *a* and *f* of Fig. 2, the sync pulses are shown as having greater amplitude than the timing pulses, to distinguish them. In practice their amplitudes may be the same.

The source A feeds phasing or phase shifting signals to a phase shift delay circuit D and such signals may take a variety of forms such as, for instance, direct current impulses. They are shown on line *b* of Fig. 2 as a single surge.

The phase shift delay circuit D is arranged so that it is triggered by a single signal *b* from A and is thereafter insensitive to other signals during the period of the delay which is slightly greater than the pulse cycle time. Thus an elongated pulse *c* is produced, shown on line *b* of Fig. 2. In this embodiment, it is, greater than the pulse cycle time by an amount sufficient to bracket one timing pulse or sync pulse over and above the pulse cycle time but not so as to overlap two or more consecutive timing or sync pulses over and above the pulse cycle time.

In certain applications of the invention it might be desirable to make the device change the phase of the output pulse in steps of more than one timing pulse, in which case the delay period of phase shift delay circuit D would need to be extended.

On or before the commencement of phase shifting signals, a start signal is applied to the mixer gate F. The start signal may be produced automatically on or before the commencement of phase shifting signals, by a separate source of start signals B'' or may be derived from a first phase shifting signal by means of a separate unit as shown by the rectangle marked B' in Fig. 1 and the dotted line connection.

The effect of the start signal is to open and hold open the gate of mixer gate F to the passage of timing pulses. This gate must remain open for as long as the altered phase of the output pulse is required to be maintained. This is shown along lines *a* and *f* of Fig. 2 where indicated by the words "Start signal."

The phase shift delay circuit D passes to the coincidence mixer E, one pulse or signal *c* hereinafter called a bridging pulse of duration equal to its delay period, for each phase shifting signal received from source A. These signals are shown along line *c* of Fig. 2.

The coincidence mixer also receives gate pulses from output pulse producer I and these gate pulses must be timed and be of a width sufficient to bracket a timing or sync pulse but not sufficient to overlap two or more of them, unless it is desired to make output pulse phase changes in steps of more than one timing pulse at a time, as previously suggested, in which case the gate pulses would need to be extended. These gate pulses are derived from the same source as the output pulse *e* and though these conditions as to timing are essential in respect of the gate pulse it is possible for the output pulse to be of different duration or timing, according to the functions it is required to perform. For purposes of illustration the gate pulses may be considered to be the same as the output pulses *e*.

Neither the bridging pulse *c* from D (line *c* Fig. 2) nor the gate pulse *e* (line *e* Fig. 2) are sufficient alone to operate coincidence mixer E and this is indicated by the dotted line along line E of Fig. 2 and inset Fig. 2B, where a gate pulse *e* first and then the beginning of a pulse *c* from D, are shown below that line. Actually the operation of the coincidence mixer need not depend upon the combined amplitude of bridging pulses and gate pulses, but may depend solely on their occurring simultaneously.

When the two coincide, however, the coincidence mixer E, emits a neutralising pulse *d*, shown in line *d* of Fig. 2 and inset Fig. 2B.

A second coincidence can be seen in line E, Fig. 2, where the reason for making the bridging pulses *c* from phase shift delay circuit D somewhat longer than the pulse cycle time is readily apparent. Normally the gate pulse *e* recurrence period is equal to the pulse cycle time and if a bridging pulse *c* from D just missed coincidence with one gate pulse, as shown, it is sure to coincide with the next one allowing for variations in the duration of the bridging pulses *c* from D within normal tolerances.

The neutralising pulses *d* from E are fed to the phase shift gate G where they close the gate while they last. This causes the suppression of one sync or timing pulse and one only, owing to the duration and timing of the neutralising pulses which are the same as those of the gate pulses.

This is illustrated in lines E *d* and *f* of Fig. 2 where a sync pulse is suppressed the first time a neutralising pulse appears. Just prior to this sync pulse, the sync delay circuit H was standing ready to be triggered by this sync pulse and in its absence, is triggered by the next pulse appearing from phase shift gate G. This is the timing pulse next after the suppressed sync pulse and the sync delay circuit H measures its delay from a different starting point. The output pulse and gate pulse from I are therefore altered in phase on their next appearance and the sync delay circuit H recovers just in time to be triggered by the recurrence of the timing pulse by which it was triggered after the suppression pulse but not soon enough to revert to the phase of the sync pulse. In the absence of other phase shifting signals this new phase of the output pulse is maintained so long as the gate in mixer gate F remains open to admit the passage of timing pulses.

Another phase shifting signal has a similar result though this time a timing pulse is suppressed, since the previous neutralising pulse has the altered phase of the gate pulse, and the sync delay circuit is triggered by the next timing pulse.

The gate pulse and output pulse, on their next appearance are again altered in phase.

Any number of phase shifting signals can be applied, shifting the phase of the output pulse one time position in the cycle of applied pulses, for each phase shifting signal.

The recurrence of phase shifting pulses is preferably slow in relation to the frequency of the applied pulses so that two phase shifting operations may not be attempted during one cycle of such pulses.

When the start condition from B'' or B' is removed, the gate in mixer gate F is closed and timing pulses no longer appear at the input of H, which is then triggered by the only pulses it receives, namely the sync pulses. The phase of the output pulses then revert to synchronism with the sync pulses.

An embodiment of the invention, developed for use in an automatic switching system, will now be described in relation to Figs. 3, 4 and 5.

In Fig. 3, the circuit elements are bracketed together in groups and marked with reference letters corresponding to the elementary circuit elements of Fig. 1 which they represent.

In this embodiment, the source of phase shifting signals is linked to a multiplex switching or communication system of the type where subscribers to the system are allotted different time positions in the scanning cycle of a continuously scanning distributor device.

The signals entering the equipment will consist of the signals of one of the subscribers to the system and will take the form of recurrent pulses occurring at a particular time position in the scanning cycle of the said distributor device.

The start signal is arranged to be produced on the first appearance of the said pulses and therefore the said multiplex switching or communication system must be arranged so that it omits no pulses when not in use and commences to emit pulses when taken into use.

The embodiment is arranged to be operated by phase shifting signals consisting of single direct current impulses and the pulses incoming to the equipment will be modulated by such signals. Various forms of pulse modulation may be used but this embodiment is designed to accept amplitude modulated pulses.

In the description which follows, the various subsidiary figures of Figs. 4 and 5 will be referred to by their reference numbers and letters alone, for example "4A," "4B," etc. and the detailed circuits can be seen in Figs. 4 and 5 whilst reference to corresponding blocks in Fig. 3 will illustrate the general layout and interrelation of the circuits. Figure 3 also has marked upon it the reference numbers of the valves included in the various circuit elements.

The pulses entering the equipment from the said switching or communication system, hereinafter called "signal pulses" are presumed to consist of negative pulses of amplitude between 100 and 200 volts, these being the modulation limits.

These negative signal pulses are fed to the grid of V1 in the phase inverter 4A consisting of a triode normally passing an anode current of 7 milliamps. The signal pulses fed to the grid of V1 even at their lowest modulation level bias the valve to cut off raising the voltage at its anode by about 200 volts.

The output from the anode of V1 therefore consists of positive voltage pulses of about 200 volts amplitude irrespective of any modulation carried by the signal pulses.

These pulses are fed to the integrator 4B containing a diode V2 to the anode of which the pulses are introduced. In the cathode circuit of V2 are a resistance and condenser in parallel, causing the cathode to be at earth potential in the absence of signals on the anode but having values such that the cathode is raised to about 30 volts positive when 200 volt pulses are applied to the anode, and is maintained at this voltage between pulses by the charge in the condenser which has time to discharge but little across resistance R5 before the arrival of the next pulse at the anode.

The substantially constant voltage is fed to the cathode follower 4C which uses a valve V3 in a conventional cathode follower circuit. A pentode strapped as a triode, is used but any convenient valve could be used.

The cathode of V3 "follows" the applied substantially constant voltage applied to its grid from V2 and the output from this stage is used to open the gate in the mixer gate F (of Fig. 1) which is represented by 5A and 5B in this embodiment.

The mixer gate, 5A, consists of two pentodes V11 and V12 having a common cathode bias resistor R38 and a common anode load R37.

These valves are normally non-conducting since their cathodes are biassed to approximately 12 volts.

Positive sync pulses are fed to the grid of V11 and positive timing pulses to the grid of V12 of a voltage sufficient to raise the grid potentials of both valves to the conducting portions of their grid-volts-anode-current curves. V11 is made conducting during sync pulses but V12 is normally cut off on its suppressor grid which is connected to the cathode of cathode follower V3 which is normally at earth potential whilst the cathode of V12 is positive in relation to earth by virtue of the potential divider constituted by R39 and R38 in series across the high tension supply. V12 suppressor grid is thus negative in relation to its cathode to an extent sufficient to make the valve non-conducting. Therefore only negative sync pulses are produced across the common anode lead until the suppressor potential of V12 is raised by the substantially constant voltage from the cathode follower V3 when the start signals commence. Thereafter timing pulses are reproduced in the common anode as well as sync pulses.

The sync and timing pulses in this embodiment are derived from the same source as the signal pulses emanating from the multiplex switching or communication system, the sync pulses occurring once per scanning cycle of the distributor device, in a constant though arbitrarily chosen phase, whilst the timing pulses synchronise with the stopping of the distributor from one of its scanned elements to another (one pulse per step).

There is, however, no necessary connection between the signal pulses and the sync and timing pulses since the former may be dispensed with in certain applications and even in this embodiment are merely one means of conveying start signals and phase shifting signals to the equipment.

For instance, the input to the device could be taken direct from a source such as a telephone subset with relay means operated by the impulse from the dial off-normal springs which could apply a steady potential to the grid of V3, 4A and 4B being omitted. There would then be no need for demodulator 4D.

From the common anode of the mixer gate 5A negative sync, and timing pulses are fed to the grid of V13 in the mixer phase inverter 5B. V13 is a conventional phase inverter, across whose anode load resistor positive 65 volt pulses are produced.

These pulses reproduce the sync and timing pulses fed into the mixer gate, and are passed to the phase shift gate 5C containing a pentode V14 normally cut off with its cathode biased to approximately 7 volts, but rendered conducting for the duration of the sync and timing pulses. The positive sync and timing pulses produced by V13 are conveyed to its control grid via the condenser C20. Negative pulses of 80 volts amplitude are developed at the anode of V14 synchronous with the sync and timing pulses.

The suppressor grid of V14 is normally positive in relation to cathode by virtue of the potential divider constituted by R50 and R51 but it is also connected to the coincidence mixer E of Fig. 1 represented by 4H in this embodiment, from which negative neutralising pulses can be applied which render V14 non-conducting. The occasion when these neutralising pulses are produced will be explained later.

The negative 80 volt pulses from the phase shift gate 5C are passed to phase shift inverter 5D containing valve V15. This stage is a conventional phase inverter, normally passing approximately 8 ma., and produces positive sync and timing pulses of 25 volts amplitude across its anode load R55.

These pulses are fed into the sync delay circuit (H of Fig. 1) which in this embodiment consists of three separate circuits, the delay guard gate 5E, the first delay circuit, 5F and the second delay circuit 5G. These three circuits will be described together.

Reference to line H of Fig. 2 shows what is required of the sync delay circuit. Two criteria must be met:

(1) The delay circuit must be insensitive during its delay period to pulses occurring after the one which triggered it.

(2) Its recovery period after the end of the delay and before it is again responsive to a triggering pulse, must be short.

It is difficult to meet the second requirement with a single delay circuit so two delay circuits in cascade, the second triggered on the termination of the delay period of the first, are used. This allows the first delay circuit the whole time of the delay of the second, to recover in time to respond to the next incoming pulse but imperils the fulfilment of the first requirement as stray pulses may trigger the first delay circuit during the delay period of the second.

To prevent this, the delay guard gate is provided which is closed during the delay period of the second delay circuit and prevents signals from reaching the first delay circuit during this time.

The delay guard gate 5E, containing valve V16, is similar to the phase shift gate except that its suppressor, instead of blanking pulses from the coincidence mixer, receives a negative impulse during the delay period of the second delay circuit, which renders V16 non-conducting and prevents any pulses appearing on the anode of that valve which might re-trigger the first delay circuit during the delay period of the second delay circuit. When these negative impulses are absent V16 is cut off on its control grid except during sync and timing pulses so that sync and timing pulses appear at its anode.

The first and second delay circuits are almost identical. Take the first, for instance. Initially the voltage on the suppressor grid of V18 is 20 volts positive, on the cathode of V19, 42 volts, and on the cathode of V18, 46 volts. Different voltages may be used by they should bear substantially the same relative relations.

The diode V19 is conducting and the control grid of V18 is maintained at about 42 volts positive. The suppressor grid of V18 is negative with respect to its cathode and V18 does not pass anode current.

The voltage at the anode of V19 tends to rise to the full high tension supply voltage but the tendency is arrested at a voltage slightly above the voltage at the wiper of the potentiometer R63 because the diode V17 becomes conducting at this point.

Owing to the value chosen for R72, a comparatively large screen current flows and the potential of V18 cathode is initially determined largely by the screen current, and is preferably some 20 volts positive in relation to the suppressor grid voltage of V18 in the quiescent condition of the delay circuit.

The input to the circuit consists of a negative pulse of approximately 40 volts amplitude applied to the cathode of V17 which causes a drop in the anode voltage of V18 which is transmitted to the grid of V18 via condenser C29 and is "followed" by the cathode of V18.

The cycle of operations in delay circuit 5F has six stages and the wave forms obtained are shown in Fig. 6, the stages being indicated by corresponding numerals along the top line of the graph.

The stages are as follows:

*Stage 1*

As V18 cathode voltage falls, V18 suppressor grid voltage soon becomes positive with respect to cathode and causes anode current to flow.

Anode load R68 is large and the anode voltage falls rendering V17 non-conducting. The continued fall of the cathode voltage of V18, following the control grid and anode voltage fall, increases the anode current of V18 because the suppressor grid becomes more positive with respect to cathode.

The change is cumulative and the anode voltage falls rapidly till the control grid, falling with it, approaches the cut-off voltage.

*Stage 2*

At this point the screen grid current is almost cut off, by the falling grid potential.

The condenser C29 now charges up slowly through R71 which has a high resistance. This permits the control grid voltage of V18 to rise slowly, followed by the cathode.

The rise of the grid voltage enables the screen grid current to rise slowly and the screen grid voltage to fall correspondingly slowly.

The rise of the grid voltage also enables a slowly increasing anode current to flow, causing a corresponding continued fall of the anode voltage. This anode potential fall is practically linear due to the feed-back action and this stage continues for a relatively long period, occupying the major portion of the delay period during which further pulses at the cathode of V17 cannot effect the operation of the circuit since V17 remains non-conducting.

*Stage 3*

When the anode voltage of V18 has nearly reached that of the cathode, a short period occurs when the anode current and consequently the anode voltage becomes constant. The feedback from the anode then ceases to operate so that the cathode and grid potentials begin to rise much more rapidly and in an exponential manner until the cathode potential relative to that of the suppressor grid, approaches the cut-off point of the latter, when the anode current is again cut off.

In the meantime the screen grid current rises sharply owing to the rising grid potential and the screen grid voltage falls proportionately.

*Stage 4*

This stage begins at the point where the suppressor grid reaches the cut-off point and occupies the time taken by the grid of V18 to rise to the point at which V19 again becomes conducting, arresting the rise at the 42 volts applied to the cathode of V19.

The screen current rises to maximum and the screen voltage to minimum during this period.

*Stage 5*

The potential at the grid end of C29 can now rise no further owing to V19 becoming conducting and the anode voltage rises exponentially till it reaches the potential of the slider of potentiometer R63 when V17 again conducts and the anode voltage can rise no further.

*Stage 6*

The circuit is now again in its quiescent condition ready to receive another trigger pulse.

The output of the circuit is taken from the screen grid of V18 in the form of a positive pulse of a length corresponding substantially to the time taken by Stages 1, 2 and 3 of the above described sequence of operations.

This pulse is differentiated by condenser C30 and resistance R72, and passed to the cathode of V20, in the second delay circuit 5G which is almost identical with 5F just described.

After differentiation, the leading edge of the pulse from 5F produces a positive peak which has no effect on 5G but the trailing edge of the pulse produces a negative peak which triggers the second delay circuit 5G.

During the delay period of 5G, 5F is quiescent and capable of being re-triggered. This must be prevented as sync and timing pulses are occurring during this time and it would defeat the object of the circuits if one of these pulses re-triggered 5F during the delay period of 5G.

A connection is therefore taken from the cathode of V21, in 5G, to the suppressor grid of V16 in the delay guard gate. The voltage wave form at V16 cathode is seen in line 2 of Fig. 6 and consists of a substantially square negative going pulse of a duration equal to the relay period of the circuit and V16 is cut off at its suppressor grid during this time, protecting 5F from false operation.

At the end of 5G delay period the suppressor grid of V16 again becomes "open" and admits the next sync pulse or timing pulse to penetrate to V17 and trigger 5F. The procedure is then repeated.

The use of two delay circuits in cascade allows ample recovery time for the first, during the delay period of the second. If one delay circuit were to be used, the onset of Stage 4 would have to be delayed to the latest possible moment to prevent false operation from a sync pulse or timing pulse before the desired one, and it would be difficult to ensure that the circuit had reached the receptive condition (Stage 6) in time to be triggered by the desired pulse.

The adjustment of the combined delay period of the circuits made up of 5E, 5F and 5G, is effected by the potentiometer R63.

The screen waveform produced by V21 is differentiated by condenser C32 and resistors R80, R81 and R82 (5H) and the diode V23. The amplitude of the differentiation peak occurring at the time of the front positive going edge of this waveform, is governed by the values of condenser C32 and resistor R80 and at the grid of V20 is negligible owing to the potentiometer network consisting of resistor R80 and diode V23.

The amplitude of the differentiation peak occurring at the time of the trailing, negative going, edge of the said waveform is governed by the values of condenser C32 and resistor R81 and the values of these components also determine the width or duration of the pulse produced by this differentiation peak, and are chosen so that the width of the pulse is somewhat greater than that of a sync or timing pulse but not sufficiently great to overlap two or more sync or timing pulses.

Valve V24 of the gate pulse producer, 5H, is normally conducting and the negative going pulses applied to its grid reduce the anode current and produce positive voltage pulses synchronising with input pulses and amplified to the extent of the amplification factor of this stage.

These pulses are taken from the anode of V24 and form the gating pulses applied to the coincidence mixer 4H, and the output pulses the phase of which it is required to alter.

According to the description so far as it has now proceeded, the sync delay circuit represented by 5E, 5F and 5G forms a continuously running circuit, triggered by the sync pulses initially, when only the sync pulses could pass the mixer gate 5A, and still continuing to be triggered only by sync pulses even after the admission of the timing pulses through the mixer gate 5A, on the passage of the start signal, since the self-protecting action of the first delay circuit during its delay period, and the closing of the delay guard gate during the delay period of the second delay circuit, prevent intermediate pulses from affecting the sync delay circuit.

The description now returns to the point at which signal pulses enter the equipment. Their course, through phase inverter 4A and onward, has been traced. The signal pulses are also passed to a demodulator 4D.

It has already been explained that, for use with this embodiment, the phase shifting signals consist of single direct current impulses which modulate the amplitude of the signal pulses.

These modulated signal pulses are passed to the cathode of diode V4, shunted by resistor R7, and condenser C5. The pulses appearing at the cathode of V4 are distorted since C5 discharges rapidly through the diode V4 but charges slowly by virtue of the characteristics of the feeding circuit (not shown). In the anode circuit of V4 there is an integration network consisting of condenser C6 and resistor R8 so that the resulting signal passed to the discriminator 4E consists of negative going signals corresponding closely to the waveform of the phase shifting signal impulses when the same are present and bearing only small traces of the signal pulse fluctuations.

These impulses are fed to the control grid of V5 in the discriminator 4E.

A low pass filter is incorporated in the grid circuit of V5, passing only the phase shift signal impulses and removing any remaining traces of the signal pulse fluctuations. This filter also protects the equipment from false operation from transients.

V5 is normally biassed so that it passes its maximum anode current and the negative going phase shift signal impulses bias the valve to cut off, and produce corresponding positive voltage impulses at its anode.

The phased shifting signal impulses from the anode of V5 are differentiated by condenser C9 and resistor R17 in phase shift delay circuit 4F where only the leading edges are significant, as will be seen. The leading edges of phase shift signal impulses from V5 anode being positive going, cause positive going differentiation peaks to be fed to the suppressor grid of V7.

The phase shift delay circuit 4F is of the same type as the first and second delay circuits 5F and 5G, but is triggered by a positive pulse on the suppressor grid instead of a negative pulse on the anode of the pentode.

The only difference in the sequence of operation is that the suppressor grid is made sufficiently positive to permit the flow of anode current resulting in the reduction of the anode voltage, instead of the anode voltage being lowered directly, so as to cause the fall of grid potential and consequently cathode potential relative to suppressor grid. In the sequence of events previously described in respect of 5F and 5G, the fall of cathode potential below suppressor grid potential was almost instantaneous, as soon as the anode potential was lowered by the negative trigger pulse. The effect of making the suppressor grid positive by a directly applied potential has substantially the same result.

As this delay circuit is not required to respond to a rapidly recurring series of pulses, its recovery time is quite adequate and it is not necessary to use two delay circuits in cascade. The delay period which is adjusted by potentiometer R14 is arranged so that it is somewhat greater than the pulse cycle period, but must not be long enough to overlap two or more pulses over and above the pulse cycle time. The reason for this is apparent on examination of lines C and E of Fig. 2 and will be further explained later. It has however already been pointed out that a different delay period may be used where phase shifting of the output pulse by steps of more than one timing pulse at a time is required.

The output from 4F is taken from the cathode and consists of negative going square bridging pulses of the duration of the delay period.

These are applied to the grid of V9 in phase inverter 4G. V9 is normally biassed so that it passes its maximum anode current and the negative square bridging pulses from the phase shift delay circuit bias it to cut-off causing a fall of anode current and a rise of anode voltage.

The output, taken from the anode of V9, consists of positive voltage pulses synchronising with the bridging pulses, and amplified by V9.

These pulses are fed to the control grid of V10 of mixer gate 4H which is raised above cut-off point during such pulses.

The cathode of V10 is, however, biassed to a potential positive in relation to the suppressor grid by the potentiometer constituted by resistors R31 and R32 and the valve is normally cut-off at its suppressor grid.

The gate pulses from the gate pulse producer 5H render the suppressor grid of V10 positive, in relation to cathode and when a bridging pulse and a gate pulse coincide, both control and suppressor grid are raised to a potential which permits anode current to flow through V10 and its anode voltage drops during the coincidence. The resulting output from the anode consists of negative voltage pulses synchronising with the gate pulses and these are the neutralising pulses referred to in connection with Fig. 1.

These pulses are fed to the suppressor grid of V14 in the phase shift gate 5C which is rendered non-conducting during such pulses.

Reference to Fig. 2 lines *d* and *f* show how these neutralising pulses overlap and suppress, in the first instance, the sync pulse which would, if not suppressed, have triggered the first delay circuit 5F. In the absence of this sync pulse 5F is triggered by the timing pulse next occurring. The timing of the gate pulse is such that only one sync or timing pulse is thus "jumped." It could be arranged to "jump" more than one place at a time by arranging for the neutralising pulse to last longer, as previously indicated.

A second phase shift signal impulse causes the 1st delay circuit to "jump" to the next timing pulse and the delay period of 5F and 5G together is such that the phase of the gate pulse and output pulse, once altered, is maintained so long as the signal pulses continue to be applied to 4A.

It will also be seen that the delay period of the phase shift delay circuit may over-lap two gate pulses without causing two phase movements from one phase shift signal impulse. If a phase shift delay pulse is so timed, the first gate pulse to coincide with it causes a neutralising pulse to appear on V14 suppressor grid and delays by one pulse the starting time of the sync delay circuit (5E, 5F and 5G) so that the next gate pulse is similarly delayed and does not in fact occur at a time capable of causing a second coincidence with the one bridging pulse.

The output pulse emanating from the output pulse producer is limited in width by the necessity of overlapping one but not more than one sync or timing pulse. If a different type of pulse is required, however, the output pulse may be shaped as required by means well known in the art.

What is claimed is:

1. Electronic means for the step-by-step selection of any one of a number of predetermined positions in a time cycle for the transmission of a pulse of electrical energy comprising means for timing a predetermined time period, means for feeding a train of pulses of electrical energy having a predetermined number of timing pulses per time period, start means for the said timing means, adapted to be actuated, during operation, by the first timing pulse following the end of a time period measured by the said timing means, means for neutralising at least one pulse immediately following the end of a time period whereby the operation of the said start means can be delayed, and means for transmitting an output pulse of electrical energy at the end of each measured time period.

2. Electronic means for the step-by-step selection of any one of a number of predetermined positions in a time cycle for the transmission of a pulse of electrical energy comprising means for timing a predetermined time period, means for feeding a train of pulses of electrical energy having a predetermined number of timing pulses per time period, start means for the said timing means adapted to be actuated by the first timing pulse applied to the said start means and thereafter by the first timing pulse following the end of a time period measured by the said timing means, and means for neutralising at least one timing pulse next after the end of a time period measured by the said timing means whereby the operation of the said start means is delayed, and means for transmitting an output pulse of electrical energy at the end of each measured time period.

3. Electronic means as claimed in claim 1 comprising means for transmitting bridging pulses each having a duration equal at least to the said predetermined time period plus the time of one timing pulse, means for transmitting neutralising pulses, connections from the bridging pulse transmitter and the output pulse transmitter respectively, to the neutralising pulse transmitter, the output pulse transmitter being adapted to transmit a trigger pulse in synchronism with each output pulse, for transmission to the neutralising pulse transmitter, which is adapted to transmit a neutralising pulse each time a bridging pulse and a trigger pulse synchronise and connecting means between the neutralising pulse transmitter and the said neutralising means.

4. Electronic means as claimed in claim 3 and comprising phasing signal transmitting means for transmitting phasing signals to the said bridging pulse transmitter which is adapted to transmit at least one bridging pulse in response to each phasing signal.

5. Electronic means as claimed in claim 4 adapted to offer a train of timing pulses to the said timer start means, the time relation between the various pulse transmitting means being such that a neutralising pulse is adapted to neutralise at least one timing pulse immediately succeeding the termination of an operation of the said timing means whereby the start of a succeeding timing operation of the said timing means is delayed.

6. Electronic means as claimed in claim 5 in which said timing pulses all have identical characteristics and which comprises means between the said pulse train feeding means and the said start means for suppressing all pulses but a predetermined one of a train of timing pulses so that the said start means is actuated by that one pulse and means for disabling such suppressing means whereby the other pulses of the train of timing pulses are admitted to the said start means, so that a pulse other than the predetermined one can operate the said start means after the start of a timing operation has been delayed as aforesaid.

7. Electronic means as claimed in claim 6 further comprising means for generating a disabling signal to operate the said disabling means.

8. Electronic means as claimed in claim 7 in which the said disabling signal is generated on the transmission of a first phasing signal.

WILLIAM LESLIE ROBERTS.

REFERENCES CITED

The following references are of record in the file of this patent:

UNITED STATES PATENTS

| Number | Name | Date |
|---|---|---|
| 2,355,334 | Scheg | Aug. 8, 1944 |
| 2,406,165 | Schroeder | Aug. 20, 1946 |
| 2,414,477 | Meacham | Jan. 21, 1947 |
| 2,422,205 | Meacham | June 17, 1947 |
| 2,426,216 | Hight | Aug. 26, 1947 |
| 2,433,667 | Hollingsworth | Dec. 30, 1947 |